United States Patent [19]

Ito et al.

[11] Patent Number: 5,318,836
[45] Date of Patent: Jun. 7, 1994

[54] DIAMOND-COATED BODY

[75] Inventors: Toshimichi Ito, Tokyo; Masaya Tsubokawa, Sodegaura; Masakazu Watanabe; Satoshi Iio, both of Nagoya, all of Japan

[73] Assignees: NGK Spark Plug Company Limited, Tokyo; Idemitsu Petrochemical Company Limited, Nagoya, both of Japan

[21] Appl. No.: 911,803

[22] PCT Filed: Jun. 15, 1990

[86] PCT No.: PCT/JP90/00782

§ 371 Date: Apr. 4, 1991

§ 102(e) Date: Apr. 4, 1991

[87] PCT Pub. No.: WO90/15787

PCT Pub. Date: Dec. 27, 1990

Related U.S. Application Data

[63] Continuation of Ser. No. 655,414, Apr. 4, 1991, abandoned.

[30] Foreign Application Priority Data

Jun. 15, 1989 [JP] Japan ................ 1-152521

[51] Int. Cl.$^5$ .............................. C04B 41/87
[52] U.S. Cl. ........................ 428/323; 428/336; 428/408; 428/697; 428/698; 428/701; 428/702; 51/295; 51/309; 501/97
[58] Field of Search ............... 428/323, 408, 698, 216, 428/697, 701, 702, 336; 51/295, 309; 501/97

[56] References Cited

U.S. PATENT DOCUMENTS

| 4,134,947 | 1/1979 | Oda et al. ............ 106/73.5 |
| 4,578,087 | 3/1986 | Tanaka et al. ........... 428/698 |
| 4,707,384 | 11/1987 | Schachner et al. ......... 428/408 |
| 4,731,296 | 3/1988 | Kikuchi et al. ........... 428/698 |
| 4,734,339 | 3/1988 | Schachner et al. ......... 428/698 |
| 4,886,767 | 12/1989 | Goto et al. ............. 501/97 |
| 4,990,403 | 2/1991 | Ito ..................... 428/408 |

FOREIGN PATENT DOCUMENTS

| 251522 | 1/1988 | European Pat. Off. |
| 64-14185 | 1/1964 | Japan . |
| 60-122785 | 1/1985 | Japan . |
| 60-195494 | 10/1985 | Japan . |
| 60-59086 | 12/1985 | Japan . |
| 61-14200 | 1/1986 | Japan . |
| 61-106494 | 5/1986 | Japan . |
| 61-109628 | 5/1986 | Japan . |
| 61-124573 | 6/1986 | Japan . |
| 61-159302 | 7/1986 | Japan . |
| 61-163273 | 7/1986 | Japan . |
| 61-291493 | 12/1986 | Japan . |
| 62-119 | 1/1987 | Japan . |
| 62-27039 | 6/1987 | Japan . |
| 62-176371 | 8/1987 | Japan . |
| 63-33570 | 2/1988 | Japan . |
| 63-100182 | 5/1988 | Japan . |
| 63-233078 | 9/1988 | Japan . |
| 2024005 | 1/1990 | Japan . |
| WO89/07093 | 8/1989 | PCT Int'l Appl. . |

OTHER PUBLICATIONS

Popper "Sintering of Silicon Nitride, A Review" Progress in Nitrogen Ceramic edited by Riley 1983, pp. 187–210.

Farabaugh et al. "Growth of diamond films by hot filament chemical vapour deposition" SPIE vol 969, 1988 pp. 24–31.

Primary Examiner—A. A. Turner
Attorney, Agent, or Firm—Armstrong, Westerman, Hattori, McLeland & Naughton

[57] ABSTRACT

The present invention is directed to a diamond-coated body having a diamond coat film formed on the surface of a ceramic substrate containing acicular grains having a thickness of 0.2 $\mu$m to 1 $\mu$m and an aspect ratio of 2 or higher at the two-dimensional density of 30% or higher, and the diamond coat film has good adhesion to the ceramic substrate. Thus the diamond-coated body is superior in durability and can be appropriately utilized as cutting tools and so on.

6 Claims, No Drawings

DIAMOND-COATED BODY

This application is continuation of application Ser. No. 655,414, filed Apr. 4, 1991, now abandoned.

TECHNICAL FIELD

The present invention relates to a diamond-coated body and, more particularly, to a diamond-coated body which can extensively be employed for various cutting tools such as bites, end mills, cutters, drills and so on and abrasion resistant members.

BACKGROUND TECHNOLOGY

Heretofore, cutting tools, etc. are prepared by coating the surface of a ceramic substrate with a diamond film. However, such a diamond film is so insufficient in adhesion as their tips cause chipping.

More description will be made on this point. For instance, Japanese Patent Publication (kokoku) No. 59,086/1985, and Japanese Patent Laid-open (kokai) Publication Nos. 109,628/1986 and 291,493/1986 disclose technology which involves using a silicon nitride substrate or a ceramic substrate having a particular thermal expansion coefficient in order to provide a diamond-coated material having high adhesion.

These technology, however, each involves prevention of the diamond film from peeling off by suppressing the thermal stress generating upon cooling after the formation of the diamond film, yet its adhesion is not yet sufficient.

For instance, when chips with such a diamond film coated thereon are used for cutting, their tips may still cause chipping.

The object of the present invention is to provide a diamond-coated body which has so high in adhesion of its diamond film as to avoid chipping and which can be prepared with ease.

DISCLOSURE OF INVENTION

The diamond-coated body according to the present invention is characterized in that the diamond film is formed on the surface of the ceramic substrate in which acicular grains having a thickness of 0.2 $\mu$m to 1 $\mu$m and an aspect ratio of 2 or higher are contained at the two-dimensional density of 30% or higher.

BEST MODES FOR CARRYING OUT THE INVENTION

Ceramic Substrate

The ceramic substrate to be employed for the present invention contains acicular grains on its surface, whose thickness ranges from 0.2 $\mu$m to 1 $\mu$m and has an aspect ratio of 2 or higher, preferably 3 or higher, more preferably 4 or higher, at the two-dimensional density of 30% or higher, preferably 40% or higher.

It is noted herein that the thickness, the aspect ratio and the content of the acicular grains referred to herein can be determined by forming a mirror surface by polishing a surface of the substrate, etching the mirror surface with phosphoric acid to remove the intergranular interface around acicular grains, taking a picture of an etched surface of the substrate and analyzing the picture by image processing in two dimentions.

The two-dimensional density referred to herein is defined by a percentage of occupation area for the acicular grains in a given constant area in a surface of substrate. The occupation area is given by totalizing each area occupied by the acicular grain in the picture.

As the acicular grains are considered as existing in a random way, the thickness and the aspect ratio of the acicular grains referred to herein are the values which are given with particles lying horizontally or obliquely taken into account.

No theoretical elucidation is yet made on the reason for improvement in adhesion of the diamond film in accordance with the present invention, which is achieved by allowing the acicular grains having the thickness ranging from 0.2 $\mu$m to 1 $\mu$m and the aspect ratio of 2 or higher to exist at the two-dimensional density of 30% or higher. However, the present inventors presume that the surface of the ceramic substrate causes minute roughness in concave and convex ways by the acicular grains and that the intergranular interface of the ceramic substrate is etched with an atmospheric plasma gas of a CVD in the initial stage of formation of diamond, thereby causing the acicular grains to project and penetrate into the diamond film formed thereon as if an anchor and, as a result, increasing a contact area between the diamond film and the surface of the ceramic substrate to a remarkable extent and increasing a peeling strength of the diamond film.

If the thickness of the acicular grains is thinner than 0.2 $\mu$m, the strength of the acicular grains itself becomes so insufficient that, even if the grains are intertwinded with the diamond film, the diamond film may be caused to be destroyed on the acicular grains side, thereby making the adhesion of the diamond film insufficient. On the other hand, if the acicular grain would have the thickness of greater than 1 $\mu$m, the effect of increasing the contact area between the grains and the diamond film may be reduced. Further, if the aspect ratio of the acicular grain is smaller than 2, the strength of the surfaces of the acicular grains of being retained in the substrate may become so weak that the acicular grains may not project over the surface of the substrate to a sufficient extent, thereby providing no effect of enlarging the contact area. If the acicular grains would be contained at the rate less than 30%, the aforesaid effect may be reduced and the adhesion of the diamond film may become insufficient.

The ceramic substrate to be employed for the present invention may be prepared, for example, from an oxide type fine ceramics, such as alumina, zirconia, mullite, spinel and so on; a non-oxide type fine ceramics, such as silicon carbide, silicon nitride, boron nitride, boron carbide, aluminium nitride, sialon and so on; and ceramics in which silicon carbide whiskers, silicon nitride whiskers, carbon whiskers or the like are dispersed in the fine ceramics.

Preferred among those as described hereinabove are ceramics prepared so as to contain silicon nitride as a major ingredient.

As a preferred example of ceramic substrate, there may be mentioned a sintered body prepared by sintering a composition composed of silicon nitride as a major ingredient and at least one sintering aid selected from the group consisting of $ZrO_2$, $MgO$, $Al_2O_3$, $Y_2O_3$ and a precursor therefor.

As a more preferred example of ceramic substrate, there may be mentioned a sintered body prepared by sintering a composition composed of silicon nitride as a major ingredient and a sintering aid consisting of $ZrO_2$ and $MgO$, or $Al_2O_3$ and $Y_2O_3$.

The precursors capable of being converted upon sintering into the oxides, such as sulfates, carbonates and halides, may be likewise used as preferred sintering aids.

Although the amount of the sintering aid to be contained in the composition cannot be determined uniformly because it may vary with the kind of the sintering aid, it may generally range from 2% to 20% by weight, preferably from 3% to 16% by weight, on the basis of the oxide weight. If the amount of the particular sintering aid would be less than 2% by weight, on the one hand, the sintered body does not become dense enough when sintered. If the amount of the sintering aid would exceed 20% by weight, on the other, the crystalline grains may grow upon sintering to such a remarkably great extent that they may not form desired acicular grains.

The sintering temperature may vary with the kind of the sintering aid and may range usually from 1,550° C. to 1,850° C., preferably from 1,570° C. to 1,830° C. If the sintering temperature would become lower than 1,550° C., on the one hand, the acicular grains may not grow to a sufficiently large extent. If the sintering temperature would exceed 1,850° C., on the other hand, the diameters of the acicular grains may become too great to presume the desired shape.

As the sintering atmosphere, there may be employed nitrogen gas or a mixed gas of inert gases such as nitrogen gas and argon gas, which does not cause decomposing silicon nitride upon sintering.

Although the sintering gas pressure may vary with the sintering temperatures, it may usually range from 10 to 300 kg/cm$^2$ and it is preferred to use the sintering gas pressure so as to control the decomposition of silicon nitride formed during sintering.

The sintering process as described hereinabove little decomposes silicon nitride in association with the action of the sintering aid and can uniformly precipitate the prismatic particles specified by the present invention into the sintered body with ease. Further, this process can readily increase the amount of the acicular grains, as compared with a mere mixture of the acicular grains with the ceramics.

Diamond Film

In accordance with the present invention, the diamond film is formed on the ceramic substrate. The terms "diamond film" referred to herein are intended to mean such a broad concept as including diamond, diamond-like carbon, and a film containing the diamond and diamond-like carbon.

The diamond film may be formed in a conventional method of forming the diamond film and the vapor phase method is practically preferred among those known methods.

Specifically, it is preferred to adopt the method of forming the coat layer on the substrate by bringing the gas obtainable by exciting a raw material gas containing a carbon source gas into contact with the ceramic substrate.

The raw material gas may be any one as long as it contains at least the carbon source gas, and a gas containing carbon atom and hydrogen atom is preferred.

As desired, there may be employed a carrier gas such as an inert gas or the like, together with the raw material gas.

As the carbon source gases, there may be employed gases of various hydrocarbons, halogenated compounds, oxygen-containing compounds, nitrogen-containing compounds, and so on.

The hydrocarbon may include, for example, a paraffinic hydrocarbon such as, for example, methane, ethane, propane, butane and so on; an olefinic hydrocarbon such as, for example, ethylene, propylene, butylene and so on; an acetylenenic hydrocarbon such as, for example, acetylene, allyclene and so on; a diolefinic hydrocarbon such as, for example, butadiene and so on; and alicyclic hydrocarbon such as, for example, cyclopropane, cyclobutane, cyclopentane, cyclohexane and so on; and an aromatic hydrocarbon such as, for example, benzene, toluene, xylene, naphthalene and so on.

The halogenated compounds may include, for example, a halogen-containing hydrocarbon such as, for example, methylene halide, ethylene halide and benzoic halide, carbon tetrachloride, and so on.

The oxygen-containing compounds may include, for example, a ketone such as, for example, acetone, diethyl ketone, benzophenone, etc.; an alcohol such as, for example, methanol, ethanol, propanol, butanol and so on an ether such as, for example, methyl ether, ethyl ether, ethyl methyl ether, methyl propyl ether, ethyl propyl ether, phenol ether, acetal, cyclic ether (such as dioxane, ethylene oxide, etc.) and so on; a ketone such as, for example, acetone, pinacholin, methyl oxide, aromatic ketones (such as acetophenone, benzophenone, etc.), diketone, cyclic ketones and so on; an aldehyde such as, for example, formaldehyde, acetaldehyde, butyl aldehyde, benzaldehyde and so on; an organic acid such as, for example, formic acid, acetic acid, propionic acid, succinic acid, butyric acid, oxalic acid, tartaric acid, stearic acid and so on; an acid ester such as, for example, methyl acetate, ethyl acetate and so on; a divalent alcohol such as ethylene glycol, diethylene glycol and so on; and carbon monoxide, carbon dioxide, and so on.

The nitrogen-containing compounds may include, for example, an amine such as, for example, trimethylamine, triethylamine.

As the carbon source gases, there may also be used petroleum, such as gasoline, kerosene, turpentine oil, camphor oil, pine root oil, etc., heavy oil or gases such as gear oils, cylinder oils, etc., although not a single substance. Further, the various hydrocarbons may be employed as a mixture.

Among those carbon source gases, there may be preferably employed the paraffinic hydrocarbons including methane, ethane, propane and so on, which is gaseous at ambient temperatures and high in vapor pressure; the ketone including acetone, benzophenone and so on; the alcohol including methanol, ethanol and so on; and the oxygen-containing compounds such as carbon monoxide, carbon dioxide gas and so on. Among these carbon source gases, carbon monoxide is particularly preferred.

The hydrogen gas is not restricted to a particular one and there may be employed ones which are obtained by sufficiently purifying ones obtainable, for example, by gasification of petroleums, conversion of natural gases, water gases and so on, electrolysis of water, reaction of iron with water vapor, complete gasification of coal, and so on.

Hydrogen constituting the hydrogen gases may comprise one capable of forming atomic hydrogen when excited.

The atomic hydrogen has the function as removing non-diamond components such as graphite and amorphous carbon which may be deposited simultaneously with the deposition of the diamond.

As the techniques for exciting the raw material gases, there may be mentioned, for example, microwave plasma CVD method, RF plasma CVD method, DC plasma CVD method, magnetic-field plasma CVD method, thermal filament method, thermal CVD method, optical CVD method, flare combustion method, sputtering method, and so on.

Among those as described hereinabove, preferred are the various CVD methods.

In a combination of the raw material gases with the exciting processes, particularly preferred for the objects of the present invention is a combination of a mixed gas between carbon monoxide gas and hydrogen gas with the microwave plasma CVD method.

More particularly, when this mixed gas is excited by microwave, the gas excited serves as depositing diamond on the surface of the substrate and, at the same time, growing diamond crystals on an intergranular phase of the surface thereof, thereby effectively enhancing the adhesion of the diamond film.

In the vapor phase method, the temperature of the substrate at the time of forming the diamond film may vary with the processes for exciting the raw material gases, so that it cannot be determined uniformly, however, it may generally range usually from 300° C. to 1,200° C., preferably from 400° C. to 1,100° C.

If the temperature would become below 300° C., on the one hand, the speed at which the diamond deposits may become slower or lose crystallinity or uniformity of the material to be depositted.

If the temperature would be higher than 1,200° C., on the other hand, the effect cannot be bettered in accordance with the elevated temperature, so that the application of such high temperatures may become disadvantageous in terms of energy efficiency and the once deposited diamond may further be etched.

The reaction pressure for forming the diamond film may range usually from $10^{-6}$ to $10^3$ torr, preferably from $10^{-5}$ to 800 torr. If the reaction pressure would be lower than $10^{-6}$ torr, the speed of depositting the diamond may become too slow or no diamond may be depositted. On the other hand, if the reaction pressure would be higher than $10^3$ torr, graphite may be formed to a large extent.

The reaction time may vary with the surface temperature of the substrate, the reaction pressure, the film thickness required and so on, so that it cannot be determined uniformly and it can be determined in an appropriate manner.

The film thickness of the diamond film formed in the manner as described hereinabove is not restricted to a particular range and may range usually from 0.5 $\mu$m to 100 $\mu$m, preferably from 1 $\mu$m to 60 $\mu$m.

Diamond-coated member

The diamond-coated member thus prepared has so good adhesion of the diamond film that the diamond film cannot readily be peeled off from the substrate.

The present invention will now be described more in detail by way of examples.

EXAMPLES 1-5 AND COMPARATIVE EXAMPLES 1-5

A mixture was prepared by mixing $Si_3N_4$ powders having an average particle size of 0.7 $\mu$m (BET specific surface area of 10 $m^2/g$), $MgCO_3$ powders having an average particle size of 0.4 $\mu$m, $ZrCO_2$ powders having an average particle size of 0.2 $\mu$m, $Y_2O_3$ powders having an average particle size of 2 $\mu$m and $Al_2O_3$ powders having an average size of 1 $\mu$m at the contents as shown in Table 1 below under wet conditions over the period of 16 hours using ethanol as a medium in a $Si_3N_4$ pot mill. After mixing, the resulting mixture was dried and press formed at the pressure of 1.5 tons/cm$^2$. The formed green body was then sintered under conditions as shown in Table 1 below, and the resulting sintered body was processed by cutting, thereby yielding silicon nitride chips (type: SPGN421) having the acicular grains as shown in Table 1 below.

The silicon nitride chips were then placed as the substate in a reaction vessel of the microwave plasma CDV apparatus.

They were then subjected to reaction at the microwave output of 300 W for 5 hours in the reaction chamber at the substrate temperature of 1,000° C. under the pressure of 50 torr while the raw material gases were fed i.e. carbon monoxide gas at the rate of 20 sccm and hydrogen gas at the rate of 80 sccm, thereby depositing a film having the film thickness of 10 $\mu$m on the substrate.

The deposited film was subjected to Raman spectrometry and it has been revealed that the peak resulting from the diamond appeared in the vicinity of 1,333 cm$^{-1}$ of the Raman scattering spectrum. Further, it has been confirmed that the resulting diamond were substantially free from impurities.

The resulting diamond-coated chips prepared hereinabove were subjected to cutting tests under the following conditions for cutting characteristics for each of the chips. Thereafter, the cutting tip of the chip was observed by a scanning electron microscope and as a result it has been found that separation and abrasion of the diamond film were little recognized on the chips obtained in the working examples after the cutting test for 10 minutes. An average cutting time till the separation of the diamond film from the respective chip upon repeated cutting tests was given and shown in Table 1 below.

Work: Al-8% (by weight)Si alloy
Cutting speed: 800 meters per minute
Feed: 0.1 mm/rev
Cut depth: 0.25 mm For the chips obtained in the working examples, it has been found that no separation of the diamond film from the respective chip was recognized upon cutting at the cutting speed of 1,500 meters per minute for 10 minutes.

COMPARATIVE EXAMPLE 6

Using the chip coated with the diamond film (having the film thickness of 10 $\mu$m) prepared in the same manner as in Example 1, a substrate composed of $\alpha$-sialon ceramics (equiaxial grains; average particle size: 1 $\mu$m) consisting of equiaxial grains yet containing no acicular grains was subjected to the cutting test in the same manner as in Example 1, for a comparative purpose. As a result of 1-minute cutting test, diamond film was found to be peeled off.

TABLE 1

| | Sintering Aids And Their Contents (MgCO$_3$ expressed in MgO converted) | Sintering Conditions Temperature °C. | Pressure, atm. | Density g/cm$^2$ | Characteristics of Acicular Grains — Average thickness of Particles μm | Average Aspect Ratio | Two-dimensional Density, (%) | Average Time Required for Peeling Off Film. (minutes) |
|---|---|---|---|---|---|---|---|---|
| Comparative Example 1 | MgO = 5% by wt; ZrO$_2$ = 5% by wt | 1,500 | 80 | 3.25 | 0.3 | 4 | 25 | 5 |
| Example 1 | MgO = 5% by wt; ZrO$_2$ = 5% by wt | 1,600 | 80 | 3.25 | 0.4 | 5 | 35 | 19 |
| Example 2 | MgO = 5% by wt; ZrO$_2$ = 5% by wt | 1,800 | 80 | 3.25 | 0.5 | 5 | 60 | 35 |
| Comparative Example 2 | MgO = 5% by wt; ZrO$_2$ = 5% by wt | 1,800 | 1 | 2.70 | — | — | — | —[1] |
| Example 3 | Al$_2$O$_3$ = 3% by wt; Y$_2$O$_3$ = 3% by wt | 1,800 | 80 | 3.23 | 0.5 | 4 | 50 | 28 |
| Comparative Example 3 | MgO = 5% by wt; ZrO$_2$ = 5% by wt | 1,900 | 80 | 3.25 | 1.3 | 3 | — | 7 |
| Comparative Example 4 | MgO = 0.5% by wt; ZrO$_2$ = 1% by wt | 1,800 | 80 | 2.72 | — | — | — | —[1] |
| Comparative Example 5 | MgO = 15% by wt; ZrO$_2$ = 10% by wt | 1,800 | 80 | 3.15 | 1.2 | 3 | — | 2[2] |
| Example 4 | Al$_2$O$_3$ = 3% by wt; Y$_2$O$_3$ = 11% by wt | 1,740 | 80 | 3.23 | 0.6 | 4 | 55 | 32 |
| Example 5 | MgO = 5% by wt; ZrO$_2$ = 5% by wt | 1,820 | 200 | 3.25 | 0.6 | 4 | 60 | 33 |

Notes:
[1] The sintered body did not become dense.
[2] The sintered body did not become dense and it was broken during cutting.

FIELD OF INDUSTRIAL UTILIZATION

The diamond-coated body according to the present invention has excellent adhesion of the diamond film because the diamond film is coated on a particular ceramic substrate. For instance, when it is employed as cutting tools and so on, neither tipping nor separation may be caused and abrasion is unlikely to occur, thereby prolonging the life of the tool. Further, the substrate can be prepared by gas pressure sitnering method and the diamond film can be formed by the vapor phase method, so that the diamond-coated body can be prepared with ease.

As described hereinabove, the present invention makes significant contribution to the field of cutting tools such as bites, end mills, cutters, drills and so on and various abrasion-resistant members.

We claim:

1. A diamond-coated body comprising:
   (a) a ceramic substrate having a surface portion which contains acicular grains having an average thickness of 0.2 μm to 1 μm and an average aspect ratio of 2 or higher at a two-dimensional density of at least 30%, said ceramic substrate consisting essentially of silicon nitride and a sintering aid and being obtained by sintering at a gas pressure of 10 to 300 Kg/cm$^2$ in nitrogen gas or a mixture of nitrogen gas and another inert gas, said sintering aid being a mixture selected from the group consisting of a mixture of MgO and ZrO$_2$ and a mixture of Al$_2$O$_3$ and Y$_2$O$_3$; and
   (b) a diamond film formed on said surface portion of the ceramic substrate.

2. A diamond-coated body as in claim 1, wherein the content of said sintering aid in the ceramic substrate is in the range of 2 to 20% by weight.

3. A diamond-coated body as in claim 1, wherein the ceramic substrate is a sintered body obtained by sintering at a sintering temperature of 1,550° C. to 1,850° C.

4. A diamond-coated body as in claim 1, wherein the diamond film has a thickness in the range from 0.5 μm to 100 μm.

5. A diamond-coated body as in claim 1, wherein the diamond film has a thickness in the range of 1 μm to 60 μm.

6. A diamond-coated body as in claim 1, wherein the diamond-coated body is a cutting tool.

* * * * *